US011375288B1

(12) United States Patent
Buckhouse et al.

(10) Patent No.: US 11,375,288 B1
(45) Date of Patent: Jun. 28, 2022

(54) METHOD AND APPARATUS FOR CAPTURING AND BROADCASTING MEDIA

(71) Applicant: Twitter, Inc., San Francisco, CA (US)

(72) Inventors: James R. Buckhouse, Palo Alto, CA (US); Andrew Jared Adashek, Alhambra, CA (US); Andrew W. McClain, Los Angeles, CA (US)

(73) Assignee: TWITTER, INC., San Francisco, CA (US)

( * ) Notice: Subject to any disclaimer, the term of this patent is extended or adjusted under 35 U.S.C. 154(b) by 0 days.

(21) Appl. No.: 14/677,623

(22) Filed: Apr. 2, 2015

Related U.S. Application Data

(60) Provisional application No. 61/974,813, filed on Apr. 3, 2014.

(51) Int. Cl.
| | |
|---|---|
| *H04N 21/81* | (2011.01) |
| *G06Q 30/02* | (2012.01) |
| *G06Q 50/00* | (2012.01) |
| *H04L 51/52* | (2022.01) |
| *H04N 21/242* | (2011.01) |

(52) U.S. Cl.
CPC ....... *H04N 21/812* (2013.01); *G06Q 30/0252* (2013.01); *G06Q 50/01* (2013.01); *H04L 51/32* (2013.01); *H04N 21/242* (2013.01)

(58) Field of Classification Search
None
See application file for complete search history.

(56) References Cited

U.S. PATENT DOCUMENTS

| | | | | |
|---|---|---|---|---|
| 6,229,904 B1* | 5/2001 | Huang | ............... | G03B 17/53 |
| | | | | 345/473 |
| 7,711,794 B2* | 5/2010 | Russell | ............... | H04L 51/00 |
| | | | | 709/224 |
| 8,495,697 B1* | 7/2013 | Goldfeder | ........ | H04N 21/23424 |
| | | | | 725/134 |
| 9,369,635 B1* | 6/2016 | Hilla | ............... | H04N 21/2187 |
| 2007/0081090 A1* | 4/2007 | Singh | ............... | G11B 27/034 |
| | | | | 348/333.11 |
| 2008/0088718 A1* | 4/2008 | Cazier | ............... | H04N 5/272 |
| | | | | 348/239 |
| 2009/0238541 A1* | 9/2009 | Verna | ............... | H04N 5/781 |
| | | | | 386/338 |
| 2010/0022351 A1* | 1/2010 | Lanfermann | ........ | A61B 5/1114 |
| | | | | 482/1 |
| 2010/0026809 A1* | 2/2010 | Curry | ............... | H04N 5/23238 |
| | | | | 348/157 |
| 2011/0013034 A1* | 1/2011 | Chiang | ............... | H04N 5/23258 |
| | | | | 348/222.1 |
| 2011/0164143 A1* | 7/2011 | Shintani | ............... | H04N 21/4223 |
| | | | | 348/222.1 |

(Continued)

*Primary Examiner* — Nasser M Goodarzi
*Assistant Examiner* — Terrika Peterson
(74) *Attorney, Agent, or Firm* — Nixon & Vanderhye, P.C.

(57) ABSTRACT

Systems and methods for providing a message to a messaging platform include capturing, by a client device installed as a fixture at a location of a live event, media of a participant of the live event. Input is obtained from the participant by the client device. A message is created based on the input comprising the media and authored by a messaging platform account associated with the live event. The message is provided to a messaging platform for broadcasting to accounts associated with the account associated with the event.

20 Claims, 8 Drawing Sheets

(56) References Cited

U.S. PATENT DOCUMENTS

| | | | |
|---|---|---|---|
| 2011/0256886 A1* | 10/2011 | Velusamy | G01S 19/24 455/456.1 |
| 2012/0004956 A1* | 1/2012 | Huston | H04W 4/20 705/14.1 |
| 2012/0072937 A1* | 3/2012 | Ikeda | G06F 16/48 725/10 |
| 2012/0192239 A1* | 7/2012 | Harwell | H04N 21/2343 725/109 |
| 2013/0046826 A1* | 2/2013 | Stanton | G06Q 30/02 709/204 |
| 2013/0063611 A1* | 3/2013 | Papakipos | H04L 63/0861 348/207.11 |
| 2013/0081056 A1* | 3/2013 | Hu | G06F 17/30705 719/313 |
| 2013/0143620 A1* | 6/2013 | Seo | H04M 1/72522 455/556.1 |
| 2013/0294749 A1* | 11/2013 | Burns | H04N 9/87 386/278 |
| 2013/0304820 A1* | 11/2013 | Vasquez | H04L 67/00 709/204 |
| 2014/0089801 A1* | 3/2014 | Agrawal | H04N 21/44222 715/719 |
| 2014/0297772 A1* | 10/2014 | LoPorto | H04L 51/32 709/206 |
| 2014/0344376 A1* | 11/2014 | Goldsmith | H04L 51/32 709/206 |
| 2014/0380145 A1* | 12/2014 | Wilsher | H04L 12/287 715/234 |
| 2015/0120829 A1* | 4/2015 | Johnson | H04L 67/22 709/204 |
| 2015/0271546 A1* | 9/2015 | Kim | H04N 21/4307 725/109 |
| 2015/0334292 A1* | 11/2015 | Tartz | G08B 6/00 348/222.1 |
| 2018/0025078 A1* | 1/2018 | Quennesson | G06F 16/00 725/141 |
| 2020/0059448 A1* | 2/2020 | Cuciti | H04L 51/18 |

* cited by examiner

Message Table
200

| * | Message ID 202 | Author Account ID 204 | Message Content 206 | Relevant Participant(s) Account ID 208 | In Reply to 210 |
|---|---|---|---|---|---|
| 212 | 1 | @adam-2 | I hate football | None | None |
| 214 | 2 | @joseph-7 | Real talk | None | 1 |
| 216 | 3 | @brian-5 | How can you say that? | @adam-2 | 2 |
| ... | ... | ... | ... | ... | ... |

FIG. 2

Account Data Table
300

| * | Account ID 302 | Display Name 304 | Followed By 306 |
|---|---|---|---|
| 310 | @keith-1 | Keith | @brian-5, @adam-2 |
| 312 | @adam-2 | Adam | @brian-5, @carrie-3, @david-4, @keith-1 |
| 314 | @carrie-3 | Carrie | @brian-5, @adam-2 |
| 316 | @david-4 | David | @brian-5 |
| 318 | @brian-5 | Brian | @david-4, @adam-2, @carrie-3, @keith-1 |
| 320 | @whatsupxxx-6 | What's Up Marketing, LLC | @adam-1, @george-9, @paul-10 |
| 322 | @joseph-7 | Joseph | @adam-1, @ashish-8 |
| 324 | @ashish-8 | Ashish | @john-11, @carrie-3 |

FIG. 3

METHOD AND APPARATUS FOR CAPTURING AND BROADCASTING MEDIA

BACKGROUND OF THE INVENTION

Social networking services allow users to author and share messages with multiple users. For example, a first user can author and publish a message for other users to read. The messages can be of a variety of lengths which may be limited by a specific messaging system or protocol. For example, a short messaging service protocol may limit messages to 140 characters in length.

Users interested in viewing messages authored by a particular user can choose to follow or otherwise connect with the particular user on a social networking service. After a first user has indicated that they would like to follow a second user, the first user will be provided with messages authored by the second user. Users can choose to follow multiple users. Users can also respond to messages and thereby have conversations with one another. Both unidirectional (e.g., follower/followee) and bidirectional (e.g., friendship) relationships may exist, depending on the type of network.

Typically, users choose to follow celebrities or other well-known individuals. Messages transmitted from these celebrities tend to produce higher engagement than other messages. For example, messages from celebrities may drive user interest in products or services referenced in these messages.

BRIEF SUMMARY OF THE INVENTION

In one or more embodiments, systems and methods for providing a message to a messaging platform include capturing, by a client device installed as a fixture at a location of a live event, media of a participant of the live event. Input is obtained from the participant by the client device. A message is created based on the input comprising the media and authored by a messaging platform account associated with the live event. The message is provided to a messaging platform for broadcasting to accounts associated with the account associated with the event.

These and other advantages of the invention will be apparent to those of ordinary skill in the art by reference to the following detailed description and the accompanying drawings.

BRIEF DESCRIPTION OF THE DRAWINGS

FIG. 2 depicts a message table in accordance with one or more embodiments of the invention.

FIG. 3 depicts an account table in accordance with one or more embodiments of the invention.

DETAILED DESCRIPTION

Figure 1:
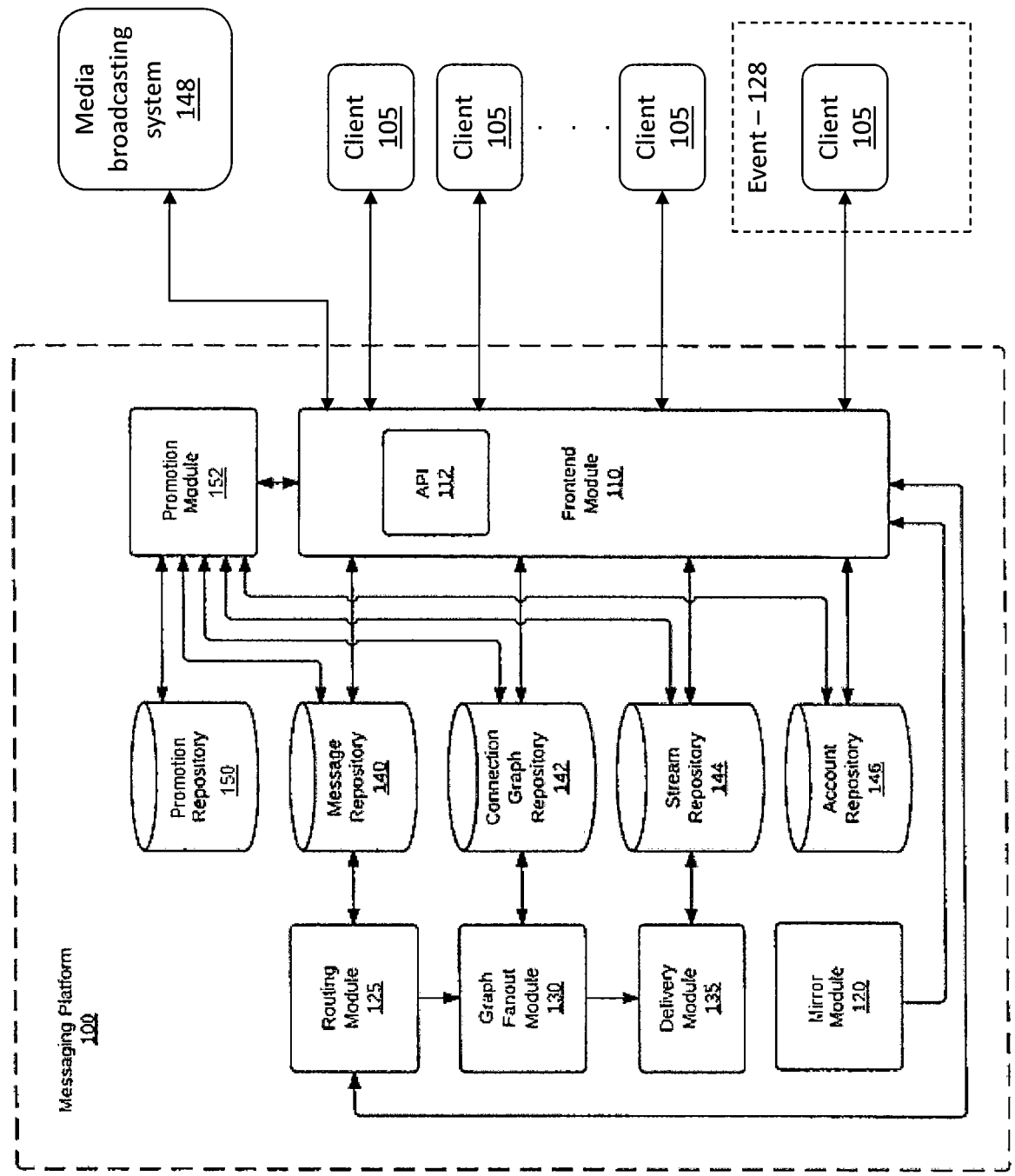
FIG. 1 depicts a diagram of a messaging platform in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention can be practiced without these specific details. In other instances, well-known features have not been described in detail to avoid unnecessarily complicating the description.

In general, embodiments of the invention provide a method and system for capturing and broadcasting media of a participant of a live event. A message including the media is broadcast by a messaging platform to accounts associated with an account of the event. FIG. 1 depicts a diagram of a messaging platform 100 according to one embodiment. Messaging platform 100 includes a routing module 125, a graph fanout module 130, a delivery module 135, a mirror module 120, a promotion module 152, message repository 140, connection graph repository 142, stream repository 144, account repository 146, promotion repository 150, and a front end module 110 including an API module 112.

In one or more embodiments, the messaging platform 100 is a platform for facilitating real-time communication between one or more entities. For example, the messaging platform 100 may store millions of accounts of individuals, businesses, and/or other entities (e.g., pseudonym accounts, novelty accounts, etc.). One or more users of each account may use the messaging platform 100 to send messages to other accounts inside and/or outside of the messaging platform 100. The messaging platform 100 may be configured to enable users to communicate in "real-time", i.e., to converse with other users with a minimal delay and to conduct a conversation with one or more other users during concurrent sessions. In other words, the messaging platform 100 may allow a user to broadcast messages and may display the messages to one or more other users within a reasonable time frame so as to facilitate a live conversation between the users. Recipients of a message may have a predefined graph relationship with an account of the user broadcasting the message. In one or more embodiments, the user is not an account holder or is not logged in to an account of the messaging platform 100. In this case, the messaging platform 100 may be configured to allow the user to broadcast messages and/or to utilize other functionality of the messaging platform 100 by associating the user with a temporary account or identifier.

It should be noted that messages are associated with a particular account which may be associated with an individual user or an entity such as a business or service. For example, a news service may have an account which is modified by one or more users. In one or more embodiments, routing module 125 includes functionality to receive one or more messages, assign a message identifier (referred to as a message ID) to each message, and store the message(s) and message ID(s) in message repository 140. In one embodiment, routing module 125 also includes functionality to determine an identification of a sender of each message and transmit the identification of the sender to graph fanout module 130.

In one or more embodiments, graph fanout module 130 includes functionality to receive an identification of the sender (i.e., a particular account via which a user is sending a message) of a message, retrieve user graph data (i.e., information pertaining to a user as described in further detail below) from connection graph repository 142, and/or determine which accounts should receive the message. User graph data, for example, can identify which accounts in the messaging platform are "following" the particular account, and are therefore subscribed to receive messages from the particular account. User graph data may include any type of unidirectional (e.g., follower, subscription, etc.) and/or bidirectional (e.g., friendship, etc.) relationships among accounts. Connection graph repository 142 stores user graph data and transmits information to graph fanout module 130 including a list of accounts associated with (e.g., following, friends with, subscribed to, etc.) the particular account in response to a request from graph fanout module 130.

In one or more embodiments, delivery module 135 includes functionality to receive the list of accounts from graph fanout module 130 and/or the message identifier generated by routing module 125. In response to receipt of this information, delivery module 135 can insert the message identifier into stream data stored in stream repository 144. In one or more embodiments, stream repository 144 stores content (e.g., message identifiers) received from delivery module 135 and/or responds to requests for information received from, for example, front end module 110. Stream data stored in stream repository 144 can make up one or more streams associated with one or more accounts of the messaging platform 100. A stream may include a dynamic list of messages associated with one or more accounts and/or can reflect any arbitrary organization of messages that is advantageous for the user of an account. A basic example of a stream is a reverse chronological list of messages authored by a set of followed accounts.

In one or more embodiments, promotion module 152 includes functionality to enable monetization or advertising on the messaging platform 100. Advertiser information is received by promotion repository 150, which may include, e.g., an advertising budget, target demographic (e.g., age, gender, interests, etc.), and associated promotional material (e.g., text, images, links, etc.). Based on the advertiser information, promotion module 152 implements advertisements or other promotions over messaging platform 100. Promotion module 152 interfaces with API 112 in frontend module 110 to send or receive content from the messaging platform 100. In one more embodiments, promotion module 152 is in communication with front end module 110. In one embodiment, mirror module 120 is in communication with other components of messaging platform 100 via front end module 110 but in other embodiments, messaging platform 100 can be in communication with other components directly. In one embodiment, promotion module 152 determines additional material, such as advertisements, to be transmitted with or included in a message from messaging platform 100. In one embodiment, messaging platform 100 determines particular additional material to be transmitted or included in a message based on one or more or content of the message, an account associated with a sender of the message, and an account associated with an intended recipient of the message.

In one or more embodiments, promotion module 152 includes functionality to promote one or more messages containing media captured by a client device at a location of a live event. Promotion module 152 can be configured to select a set of accounts based on a target demographic, relevance to the event or broadcast partner, predicted engagement rate of the accounts with the message, and/or any number of other criteria for selecting accounts. Promotion module 152 can then be configured to insert the one or more promoted messages into streams of content for consumption by the accounts. The promoted message can include advertising content and/or user generated content, in accordance with various embodiments. For example, a promoted message can be any message authored by an account of the messaging platform 100. In this example, accounts having a predefined graph relationship with the authoring account (e.g., friends/followers of the account) receive all messages authored by the authoring account. The authoring account can promote one or more authored messages in order to surface those messages to a wider audience (e.g., accounts outside of the predefined graph relationship).

In one or more embodiments, mirror module 120 includes functionality to receive content from one or more clients 105 and process the content before sending. For example, mirror module 120 may receive media from client 105 located at event 128 as shown in FIG. 1 and edit the media before broadcasting.

In one or more embodiments, account repository 146 includes functionality to receive, store, and/or transmit data concerning accounts. For example, account repository 146 may be configured to store information related to accounts such as contact information, location information (e.g., an address), etc. Account repository 146, as shown in FIG. 1, is in communication with front end module 110.

Front end module 110, in one or more embodiments, includes functionality to transmit and receive information from one or more clients (e.g., clients 105). Front end module 110 includes functionality to serve message streams via interaction with various modules. In one embodiment, the functionality described in conjunction with front end module 110 is contained in API module 112. Front end module 110 is in communication with client 105 which, in one embodiment, is used an end point as described below.

An overview of the operation of messaging platform 100, in accordance with various embodiments of the invention, is as follows.

In one or more embodiments, client 105 includes functionality to compose one or more messages in response to user input. For example, a user associated with a particular account can author a message to be sent from any entry point (e.g., client 105). In general, the entry point can be based on the operation of any computing device, for example, a mobile phone, a tablet, a personal computer (laptop, desktop, or server), or a specialized device having communication capability. The entry point can utilize any of a number of interfaces including a web-based client, a Short Messaging Service (SMS) interface, an instant messaging interface, an email-based interface, an API function-based interface, etc. The entry point may be configured to transmit the message through a communication network to messaging platform 100.

In one or more embodiments, routing module 125 receives the message and, in response, stores the message in message repository 140. The message is assigned an identifier referred to as a message ID which is stored along with the message in message repository 140. Routing module 125 may be configured to store an identification of a sender (e.g., an account ID associated with an individual or an account associated with a non-human entity such as a business or service) along with the message in message repository 140.

In one or more embodiments, the identification of the sender is passed to graph fanout module 130 which, in response, retrieves user graph data from connection graph repository 142. User graph data contains information indicating which accounts are associated with (e.g., following) a particular account, and are therefore subscribed to receive messages or indications regarding messages sent by a user via the particular account. In one embodiment, the sender of the message does not specify recipients when posting the message to the messaging platform 100. Graph fanout module 130 uses the user graph data to determine which accounts associated with the messaging platform 100 should receive the message. In one embodiment, delivery module 135 receives a list of accounts (from graph fanout module 130) and the message identifier (generated by routing module 125).

In one or more embodiments, delivery module 135 inserts the message identifier into one or more message streams associated with each account identified in the list of accounts. The message streams are stored in stream repository 144. A message stream, in one or more embodiments, comprises messages associated with a particular account. For example, the home message stream of each account can include all messages posted by followed or friended accounts. In one or more embodiments, the frontend module 110 includes functionality to create one or more message streams in response to user input. For example, a user may select any number of accounts to be included in a given stream. The stream will then display only messages posted by the selected accounts. Message streams can reflect any organization of the messages that can be advantageous for a user of an account on messaging platform 100.

In one or more embodiments, promotion module 152 may work in conjunction with delivery module 135 to implement promotions based on one or more factors such as a user's demographic information, content of a message, an account associated with a sender of the message, and an account associated with an intended recipient of the message. In one embodiment, the user's demographic information can be determined by analyzing the user's message history, user-inputted information, associated accounts, etc. For example, promotion module 152 may insert a promoted message in the message stream of a user based on the user's interest.

In one or more embodiments, front end module 110 uses storage modules 140, 142, 144 for serving messages to a user of an account on messaging platform 100. In one or more embodiments, stream repository 144 is accessed by front end module 110 to identify a particular message stream. Messages identified by a particular message stream can then be retrieved from message repository 140. Message streams can be constructed using information from connection graph repository 142 and stored in stream repository 144.

Similar to the entry point, a user can use any end point (e.g., client 105) to receive one or more messages. The end point can also be any computing device providing one or more of a number of interfaces. For example, when the user uses a web-based client to access their messages, front end module 110 can be used to serve one or more message streams to the client. Where the user uses a client that accesses messaging platform 100 through an API (application programming interface), API module 112 can be utilized to serve one or more message streams to the client for presentation to the user. Similarly, different forms of message delivery can be handled by different modules in front end module 110 (e.g., by additional modules not shown). The user can specify particular receipt preferences which are implemented by modules in front end module 110.

Messages, in one or more embodiments, are stored in message repository 140. FIG. 2 depicts an example of a message table 200 which includes multiple records (e.g., 212, 214, 216) containing message data fields 202-210 associated with a message identified by message ID 202. Author Account ID field 204 contains an identifier indicating an account associated with an author of the message identified by message ID 202. In one or more embodiments, each account is associated with a unique account ID. For example, a user may select the identifier "@adam-2." Other identifiers, such as alpha-numeric identifiers, can be selected as well. Message content 206 contains the content of a message identified by message ID 202 field. Typically, the content of a message includes text. However, in one or more embodiments of the invention, a message can be any container for a variety of different types of content. Thus, for example, message content can include various media and/or may include one or more references to various media (e.g., a uniform resource locator (URL) of a video).

Connection graph data, in one or more embodiments, is stored in connection graph repository 142. Connection graph data, in one embodiment, reflects which accounts in messaging platform 100 are associated with (e.g., following, friends with, subscribed to, etc.) a particular account and are, therefore, subscribed to receive status messages from the particular account. Connection graph data can also reflect more sophisticated graph relationships between the accounts. FIG. 3 depicts account data table 300 which includes multiple records 310-324 containing user data 304-306 associated with an account identified by account ID 302. Account ID field 302 contains an identifier which uniquely identifies each account of the messaging platform 100. In one embodiment, the account ID is selected by a user. Although many users may choose to select an account ID that is a concatenation of the user's first and last name, or the name of a business or service, account ID can be an arbitrary alpha-numeric string. Display name 304 contains an identifier indicating a user's name. In one or more embodiments, display name 304 is a character string, typically chosen by a user and comprising the user's actual name. In other embodiments, display name 304 may be a business name, a pseudonym, and/or any other display name selected by a user of the account. Each display name 304 is associated with a particular account ID 302. In one or more embodiments, user names and account IDs are used to facilitate recognition of authors by readers and are used by messaging platform 100 to perform various functions.

In one or more embodiments, followed by field 306 contains identifiers indicating accounts following an account identified by account ID 302. In one or more embodiments, a user can choose to follow another account. A user following a particular account receives messages authored by a user associated with the particular account intended for public viewing. For example, if the user associated with the particular account enters a message for public viewing, all users following the particular account can view the message. In one or more embodiments, users following the particular account will receive a push notification (on their computing device) indicating that a user associated with the particular account has posted a message. In one or more embodiments, users following the particular account will receive a copy of the message the user of the particular account authored for public viewing. For example, FIG. 3 shows that account "@adam-2" is followed by"@keith-1", "@brian-5", "@carrie-3", and "@david-4". As such, "@keith-1", "@brian-5", "@carrie-3", and "@david-4" are subscribed to receive messages authored by a user associated with the account "@adam-2". In one or more embodiments, followed by field 306 is implemented as a bidirectional relationship field (e.g., friendship) and represents a mutual connection between accounts of the messaging platform.

Message repository 140 can be used to generate message streams comprising lists of messages for presentation to a user based on various criteria. For example, a message stream can contain a list of messages from accounts that a particular account is associated with (e.g., following, friends with, etc.).

Message stream data, in one or more embodiments, is stored in stream repository 144.

It should be noted that messages can be categorized into various types. For example, a message posted by a particular author without an indication that the message is directed to a particular account may be referred to, in one embodiment, as a broadcast message or simply a message. Broadcast messages are displayed to users with accounts associated with (e.g., following, friends with, etc.) the account of the broadcast message. A message in reply to another message is considered a reply message or, more simply, a reply. In one embodiment, the category of a message determines whether the message will be designated to be displayed to another account or included in other account's message streams.

A direct message (also referred to as a private message) is a message that explicitly identifies one or more accounts as recipients. For example, a message from a user associated with the account @keith-1 that is explicitly directed (by the user authoring the message) to the account @carrie-3 is considered a direct message from @keith-1 to @carrie-3.

Figure 4:
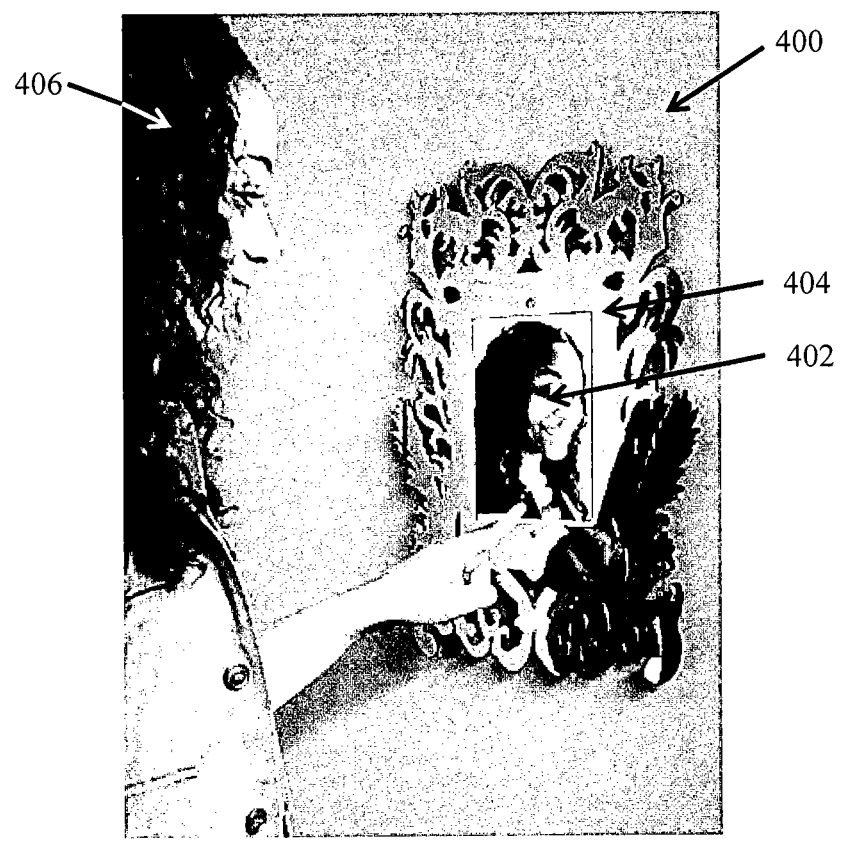
FIG. 4 depicts a mirror client device in accordance with one or more embodiments of the invention.

As noted above, client 105 can be any type of computing device, such as, e.g., a mobile phone, tablet, computer, etc. For example, referring now to FIG. 4, client 105 comprises mirror client device 400 in accordance with one embodiment. Mirror client device 400 includes any computing device 402 having a sensor, such as a camera. In one or more embodiments, computing device 402 can be a tablet, or other type of device, to generate media (e.g., images, video, audio, etc.) of a subject. Frame 404 is coupled around computing device 402. Frame 404 can be decorated and/or illuminated to attract attention from participants 406 and integrate computing device 402 into the surrounding environment. Frame 404 can be made of any suitable material such as wood, plastic, metal, etc. In one embodiment, frame 404 is made of Plexiglas having a thickness of a quarter inch. Frame 404 may include advertising for the event, sponsors, messaging platform 100, etc. Mirror client device 402, in one embodiment, can be turned off or locked when not in use for an amount of time (e.g., a user-specified amount of time).

Figure 5:
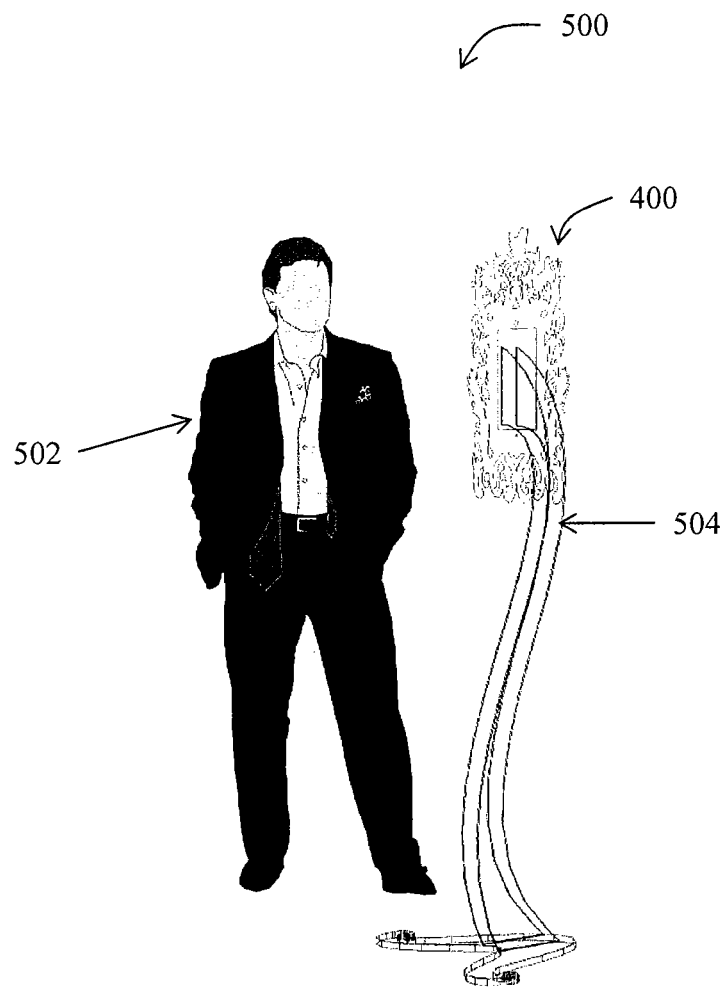
FIG. 5 depicts a mirror client device in a virtual photo-booth type environment in accordance with one or more embodiments of the invention.

Referring now to FIG. 5, mirror client device 400 can be used in a virtual photo-booth type environment 500 in accordance with one embodiment. Environment 500 can be a physical structure or a virtual photo-booth area (i.e., a restricted area) where media of participants 406 or other subjects is captured. In one embodiment, environment 500 has dimensions of seven feet tall, two and a half feet wide, and three feet deep; however, other dimensions may be employed depending on the application, expected use, and other factors.

In some embodiments, position indicators (not shown) are marked (e.g., on the floor) in environment 500 to indicate ideal positioning of one or more participants 502. The positions can include a desired position for a single participant (or any other subject) and/or a desired position for a group two or more participants. The desired position, in one embodiment, is based on a determination of where one or more participants should stand to produce a desired image. Environment 500 may include backdrop images or props, which may include advertising or other promotional items.

Client 105, such as, e.g., mirror client device 400, is positioned in environment 500 to observe participants 502 using one or more sensors (camera, microphone, etc.) to generate media. Mirror client device 400 is preferably mounted as a fixture on a stand 504 so that it doesn't wiggle or tip over when interacted with. Other mounting configurations are also contemplated, such as being held or supported by a host or an attendant (e.g., a host or attendant of the event), mounted to a wall, etc. Stand 504 can be made of any suitable material, such as, e.g., Plexiglas, plastic, acrylic, wood, metal, etc. In one embodiment, mirror client device 400 is mounted to be height adjustable to accommodate capturing images of participants of different heights or builds.

Figure 6A:
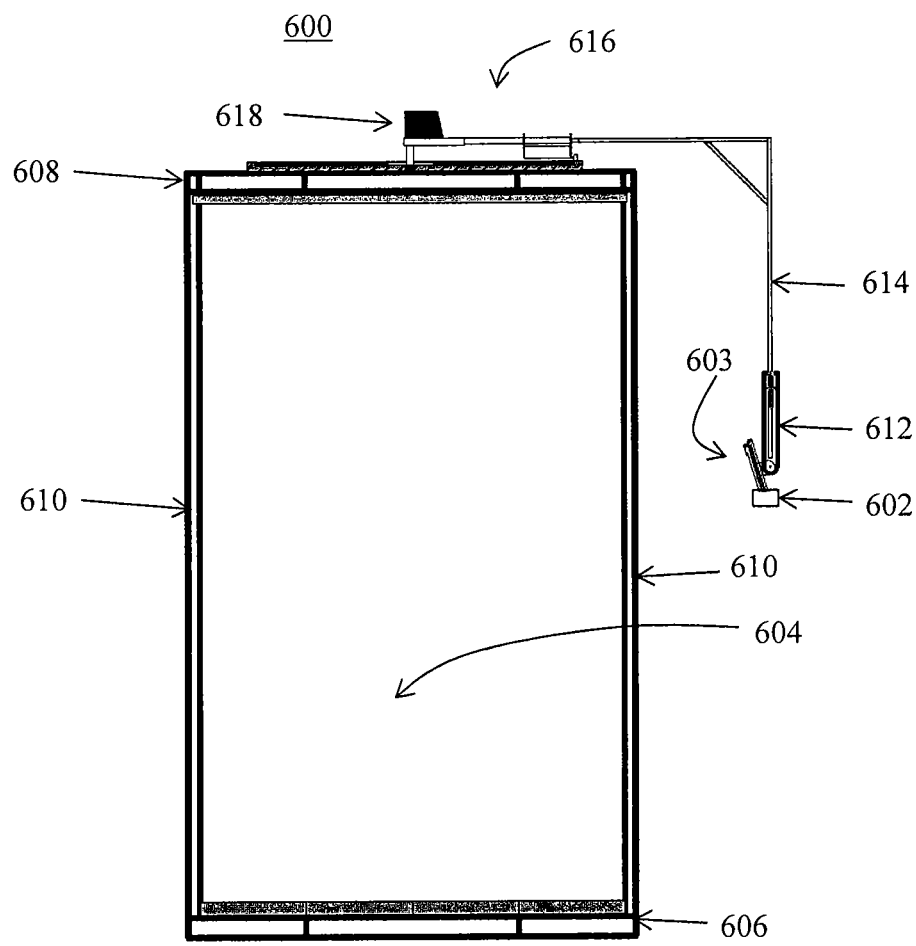
FIG. 6A depicts a front view of a system for rotatably observing a subject in accordance with one or more embodiments of the invention.
Figure 6B:
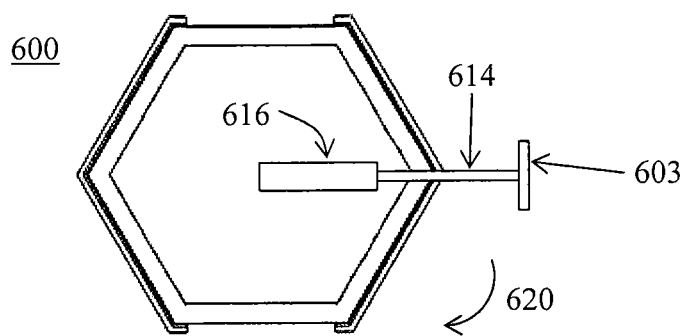
FIG. 6B depicts a top-down view of a system for rotatably observing a subject in accordance with one or more embodiments of the invention.

In one embodiment, client 105 is configured to rotatably observe a subject or participant within a booth 600. FIG. 6A shows a front view of a booth 600 configured to rotatably displace the client device 603 in accordance with one embodiment. FIG. 6B shows a top-down view of the booth 600 in accordance with one embodiment.

Client 603 includes any computing device having one or more sensors 602, such as, e.g., an imaging device, for generating media. In one embodiment, client 603 includes one or more of an inward facing camera (i.e., facing towards booth 600), an outward facing camera (i.e., facing away from booth 600), multiple cameras, a microphone to capture audio, etc. For example, in one embodiment, client 603 captures a plurality of images which are processed to generate stop motion video. The stop motion video may be in a raw, Graphics Interchange Format (GIF), MPEG, AVI, or any other suitable format. In another embodiment, client 603 can stitch together images from sensor 602 to generate a panoramic image of a participant or subject. For example, client 603 can generate a 360 degree panoramic image of a subject. It should be noted that client 603 and sensor 602 can be discrete components or part of a same, single device. For example, in one embodiment, client 603 is located separate from sensor 602 and the two are in communication via wired or wireless methods. In some embodiments, booth 600 may include multiple clients 603 simultaneously capturing media.

Booth 600 includes a base platform 606 coupled to a top platform 608 by one or more supporting uprights 610. Uprights 610 can be made of any suitable material to support the top platform 608 and motor 616, such as, e.g., wood, plastic, metal, etc. Sensor 602 (and in some embodiments client 603) is secured by mount 612 (e.g., casing), which is coupled to a motor 616 by a bracket 614. In one embodiment, bracket 614 includes an L-shaped arm piece (or any piece designed/shaped to lower components 602, 603, and 612 to within visible angle and distance of the subject inside the booth 604). It should be understood that where client 603 and imaging device 602 are discrete components, sensor 602 may be secured with mount 612 and client 603 can be located at a remote location. Booth 600 may also include advertising or other promotional items.

Client 603 is communicatively coupled to control box 618 of motor 616 by any suitable means. In one embodiment, client 603 is coupled to control box 618 via Bluetooth. A power cord can be run from top platform 608, down bracket 614 to sensor 602 or client 603 to provide power.

Observation of a participant in booth 600 can be configured according to user defined settings, which, in one embodiment, include one or more of, e.g., timeout, shutter duration, pause duration (length of pause/delay between shutter duration), motor speed, total motor time, spin direction, record audio, change direction after each spin, use front camera, etc. Other settings are also contemplated. In one example, the pause duration is twice the amount of shutter duration and the motor speed does not exceed 100. In some embodiments, the user is presented with one or more preset configurations. The preset configurations can provide different stylistic renderings of the captured video.

In one embodiment, the settings are configured as follows: shutter duration: 0.07 seconds, pause duration: 0.14 seconds, motor speed: 70-78, total motor time: 11 seconds (e.g., for one full arm rotation).

In one embodiment, a user pushes a button or other user interface on client 603 or sensor 602 to begin capture of media. A countdown may commence, which can involve one or more notifications informing the user and others nearby to position themselves away from bracket 614. The notifications may include visual notifications (e.g., countdown), audio notifications (e.g., intermitted beeping), haptic feedback, and/or any other types of notifications. The notifications, in one embodiment, include visual and/or audio warnings that bracket 614 will be moving.

Upon commencement of media capture, motor 616 rotatably displaces (e.g., clockwise rotation 620) sensor 602 around the subject at a position 604 within booth 600 for a user specified degree of rotation. In one embodiment, the media includes stop motion video captured as a stitching of a plurality of images. In some embodiments, a replay of the captured media is automatically replayed. Alternatively or in addition, a replay option is presented to the user. Upon review, a user can opt to retake the video or approve the video to send as a message.

In some embodiments, client 105, such as mirror client device 400 and client device 603, is employed on-site at a live event 128, such as sporting events, award shows, movie premieres, etc. In one embodiment, the live event 128 is also broadcasted live, e.g., via television, internet, etc. by media broadcasting system 148 to viewers viewing the broadcast at a remote location. Client 105, e.g., mirror client device 400 or client device 603, is assigned one or more hosts to direct one or more participants of the event (e.g., celebrities) to use client 105. The host can be associated with the event, messaging platform 100, media broadcasting system 148, etc. The host is there to entice participants, protect against aberrant messages, problem-solve mishaps, and to be the talent-facing ambassador. The host can help participants capture media, which can involve interacting with a screen of client 105 to take a picture, adjusting the framing as needed, focusing the camera, etc. The host can also adjust the position of mirror client device 400 to aim the camera or sensor at the participants, as well as adjust for different heights and sizes.

The one or more participants of the live event 128 may generate messages using client 105 in response to a prompt. In one embodiment, client 105 may randomly select a prompt from a plurality of predetermined or prewritten prompts, display the selected prompt, and receive input (e.g., from the participant or host) to capture media of the participant. For example, client 105 may display the prompt "make a funny face." The prompts may include media of one or more participants that was previously captured by client 105. In another embodiment, the prompt may include a message received from a second client 105 at the live event 128. Client 105 may be located in a private or restricted access area and the second client 105 may be located in a publically accessible area (and vice versa). For example, a first client device may be permanently installed in a dugout of a baseball stadium and a second client device may be located at a location accessible by spectators of a baseball game. Players in the dugout may transmit a message as a prompt using the first client device to the spectators on the second client device, and vice versa. In other embodiments, the prompt may be received from viewers of the broadcast of the live event 128. In response to the prompt, client 105 may receive input to capture media.

Lighting is employed in one embodiment to illuminate the participants in, e.g., environment 500 or booth 600. In some embodiments, lighting is also employed to illuminate client 105 in order to attract participants and/or integrate client 105 into the surrounding environment. The lighting, in one embodiment, is directed towards the faces of the one or more participants. The lighting can include a soft box or low-level light-emitting diode (LED) light. Overly bright lights are avoided in one embodiment as it may hurt the eyes of the participants and cause defects or blemishes to be revealed in the captured images or other media. The low-level lights (e.g., 90-150 watts) can be covered with a diffuser (e.g., a semi-transparent white Plexiglas or a soft box cover) to soften the light further. In some embodiments, the brightness of the screen of the client 105 (e.g., mirror computing device 400 or client 603) is adjusted based on an amount of light directed toward the participants (e.g., at the face of the participants) to provide more or less ambient lighting.

The one or more participants of the event 128 send a message from client 105 to users with accounts associated with (e.g., following, friends with, etc.) the account of event 128. The message is a broadcast message in one embodiment, but may include other types of messages as well. In one embodiment, the message is authored by an account of a messaging platform. It should be understood that a user of the authoring account does not necessarily compose the message. For example, the message may be composed and sent automatically.

The message is provided to the messaging platform 100 to the users with accounts associated with the account of event 128. In some embodiments, client 105 sends a message including multiple formats of the media distributed simultaneously to frontend module 110 of messaging platform 100. For example, client 105 may transmit to frontend module 110 a higher quality format of the media (e.g., high definition) for display on a broadcast of the event 128 (e.g., via television, internet) and simultaneously transmit a lower quality format of the media for broadcasting over messaging platform 100, internet embedding, etc.

The message is sent to accounts associated with the account of event 128 to promote viewer engagement with those attending the live event 128 and/or those viewing the broadcasted live event. Messages from client 105 also help drive tune-in to live events through vibrant real-time conversations. It should be understood that participants can also send messages to users with accounts associated with other accounts, such as, e.g., the participant's account, the account of the messaging platform 100, etc. In one embodiment, messages are reviewed in order to determine if particular messages will be allowed to be sent from the account of the messaging platform in order to maintain editorial control of the messages associated with the event. In another embodiment, the account of the messaging platform re-broadcasts the messages (e.g., as relevant content).

The messages are created comprising the media captured by client 105 (e.g., mirror client device 400 and/or client 603). The media can be of the one or more participants of the event and/or can include other content as well (e.g., media of the event, advertising or promotional items, etc.). Prior to being transmitted, the media can be edited or stylized. This can occur locally on the client 105 or at the messaging platform 100 using mirror module 152. For example, media (e.g., an image) can be edited to adjust for exposure, contrast, brightness, saturation, noise reduction, etc. This editing can be automatic or user selected. In some embodiments, one or more preset editing options are available to select from. For example, the one or more preset editing options alter the image in accordance with different styles, such as, e.g., black and white, vintage, high saturation, etc. In other embodiments, the participants are presented with one or more decorative border options which may be applied at one or more sides or around a border of the image. In some embodiments, a single editing or stylizing preset is automatically applied to all images taken for the event to promote the event, brand, etc. In one embodiment, all media captured for the event 128 includes an advertisement or promotion (e.g., for the event, sponsors, participant, etc.). Promotion module 152 can be configured to automatically promote one or more messages including media from the event according to any number of predefined criteria.

In addition, in other embodiments, client 105 receives input to permit the one or more participants to write or draw over the media prior to being transmitted. This can involve one or more inputs of device 105, such as a touch screen, stylus, mouse, etc. The writing can include drawings, a message, an autograph, etc. overlaying the media.

Once the media is captured (and possibly edited), the participant may be presented with an option to save the media locally on the client 105. For example, an image is saved if the participant clicked a "love it" field after the taking photo. In some embodiments, such as where internet connectivity is not available, media is saved on the computing device and transmitted at a later time (e.g., when internet connectivity is available).

The message may also include content (e.g., text) to be sent along with the media. The content may be directly input by the one or more participants, or may be selected from one or more prewritten messages approved prior to the event by representatives of the event, preferably between two to four prewritten messages. The prewritten messages may be written by the event in one embodiment to drive tune-in of the broadcast and engagement of viewers. In another embodiment, the prewritten messages may be written by advertisers, sponsors, or a user of an account associated with the event.

In one embodiment, the message includes one or more key phrases (e.g., a hashtag) or metadata tags relating to the event, participants, advertisers, sponsors, etc. A key phrase can be any sequence of text following a predefined format such that the key phrase can be identified by the predefined formatting. For example, the inclusion of one or more characters or formatting elements such as a hash character (#) prefix can be used to identify a key phrase. The messages can also include links directing users to websites relating to the event, participants, sponsors or other advertisements, etc. For example, the link can direct users to the website of the event or participant, or a live stream of the event.

In other embodiments, the message also includes a reference or tag to the account of the one or more participants. This can involve manual entry of the participants' account identification (e.g., an account identifier or username) information. An autocomplete feature can be presented after one or more characters are input. The data supporting the autocomplete feature can be based on a list of participants of the event. In other embodiments, one or more participants 406 are able to select their account from a list of accounts. The list of accounts can include one or more of a list of accounts of participants of the event, a list of accounts of participants identified from the image via recognition software (e.g., facial recognition), a list of accounts of participants based on a schedule of appearance time and location (e.g., on stage, back stage, in the green room, on the red carpet) for a user determined time period before or after the current time, accounts of users located within a threshold distance based on sensors of a mobile device, etc.

Once the message is sent, the one or more participants are given the option to re-broadcast the message to accounts associated with their own account. The re-broadcast message can be modified and can include additional content selected by the participant. The message for the re-broadcast message can be selected from prewritten messages approved by the event or may be written by the one or more participants themselves. Re-broadcasting can also be performed on the personal (e.g., mobile) devices of the one or more participants.

Account identification information is entered in a similar manner to the method described in connection with selecting accounts for reference or tagging in the message. This includes, e.g., manual entry, autocomplete feature, selection from a list of accounts based on participants of the event, identification from the picture, schedule of time and location of appearance, etc.

In some embodiments, the message is automatically re-broadcast to the accounts associated with all participants of the event, to participants identified from the image, to participants according to a (e.g., appearance) schedule of the event, to accounts identified as possibly being interested in the event, to sponsors of the event, and/or to advertising clients of the messaging platform 100, etc. In one embodiment, rebroadcasting can include sharing the message by other accounts of the messaging platform. Re-broadcasting can be performed in response to user input or can be performed by the messaging platform 100 in accordance with predefined rules associated with an account.

Media broadcasting system 148 broadcasts the event 128 (e.g., via television, internet, etc.). In one embodiment, media broadcasting system 148 includes an external broadcast system that can interface with API 112 of the frontend module 110 to send and/or receive content relating to the event 128. Media broadcasting system 148 can display the message or the re-broadcasted message during their coverage of an event. In one embodiment, media broadcasting system 148 displays messages or re-broadcast messages in real time or near real time to promote viewer engagement and drive tune-in of the event, as messages about the event are broadcast to users who are not yet watching the show, which entices them to watch. In another embodiment, media broadcasting system 148 automatically displays messages based on a volume of messages on messaging platform 100 (e.g., relative to a threshold). Media broadcasting system 148 can also include on-air shots of client 105 and/or include branding of the event or message platform 100 on the lower third of the broadcast (e.g., lower third of a television screen receiving the broadcast). In some embodiments, advertisers can work with the messaging platform and media broadcasting system 148 to include broadcasting or promotions (e.g., promoted messages) on the broadcast.

In one embodiment, client 105 may be employed to capture media of viewers attending the event 128. For example, client 105 may capture media of a different viewer in each frame. In another example, client 105 captures media at predetermined time intervals. The media may be stitched together to from a stop motion video. In other embodiments, multiple cameras may feed into client 105. Based on a volume of messages (e.g., relative to a threshold) on messaging platform 100 (e.g., determined via API 112), client 105 identifies a particular period of time for aggregating and synchronizing the multiple camera feeds into a single stop motion video. The video is provided to messaging platform 100 and broadcast to accounts of the messaging platform 100, such as, e.g., accounts associated with the account of the event 128 or a subset of accounts of messaging platform 100 (e.g., based on interest of those accounts and/or relevance to those accounts) as promoted content.

The volume of messages on messaging platform 100 discussed herein may be based on, for example, messages associated with (e.g., referencing via key phrase) the, e.g., live event 128, the broadcast, the media broadcasting system 148, the one or more participants, a total volume of messages on the messaging platform, etc. The volume of messages may be measured as an instantaneous number of messages, a rate of new messages (e.g., one thousand messages a second), or any other suitable measure. The volume of messages may be compared to a threshold.

In one embodiment, the threshold may be a predetermined threshold value representing the volume of messages. For example, a particular period of time is selected where the volume of messages is above the predetermined threshold value of ten thousand messages per second. In another embodiment, the threshold may be a variable determined based on historical data. For example, the threshold value may be based on a historical volume of messages of live event 128 and of events related to live event 128 (e.g., all award shows, all music or movie award shows, all sporting events, etc.). The historical volume of messages may be from prior versions of live event 128 or related events (e.g., previous years), an immediately preceding time period (e.g., past hour), etc. The threshold value may be determined as an increase from the historical volume of a predetermined amount (e.g., the threshold value may be one thousand messages a second over the average rate of messages from the past minute), a percent increase from the historical volume (e.g., a 50% increase from the average rate of messages from the live event 128 from the previous year).

The single video may include a stop motion video, a tiled video, etc. The video may be broadcast to accounts of the messaging platform 100 (e.g., all accounts or accounts associated with event 128) or may be provided to media broadcasting system 148 for broadcasting.

In other embodiments, media captured from client 105, e.g., mirror client device 400 and client 603, is employed for interaction with users and viewers. For instance, a message including the media can be broadcasted or displayed on a large display (e.g., Jumbotron) or billboard, which can be used as an advertisement, a visual voting card, etc. In another example, a video is transmitted as a response to a question. In another embodiment, media captured from client 105 is transmitted (e.g., via Bluetooth, Wi-Fi, near field communication, etc.) to a second client for approval, editing, writing a message, and etc. prior to broadcasting.

Figure 7:
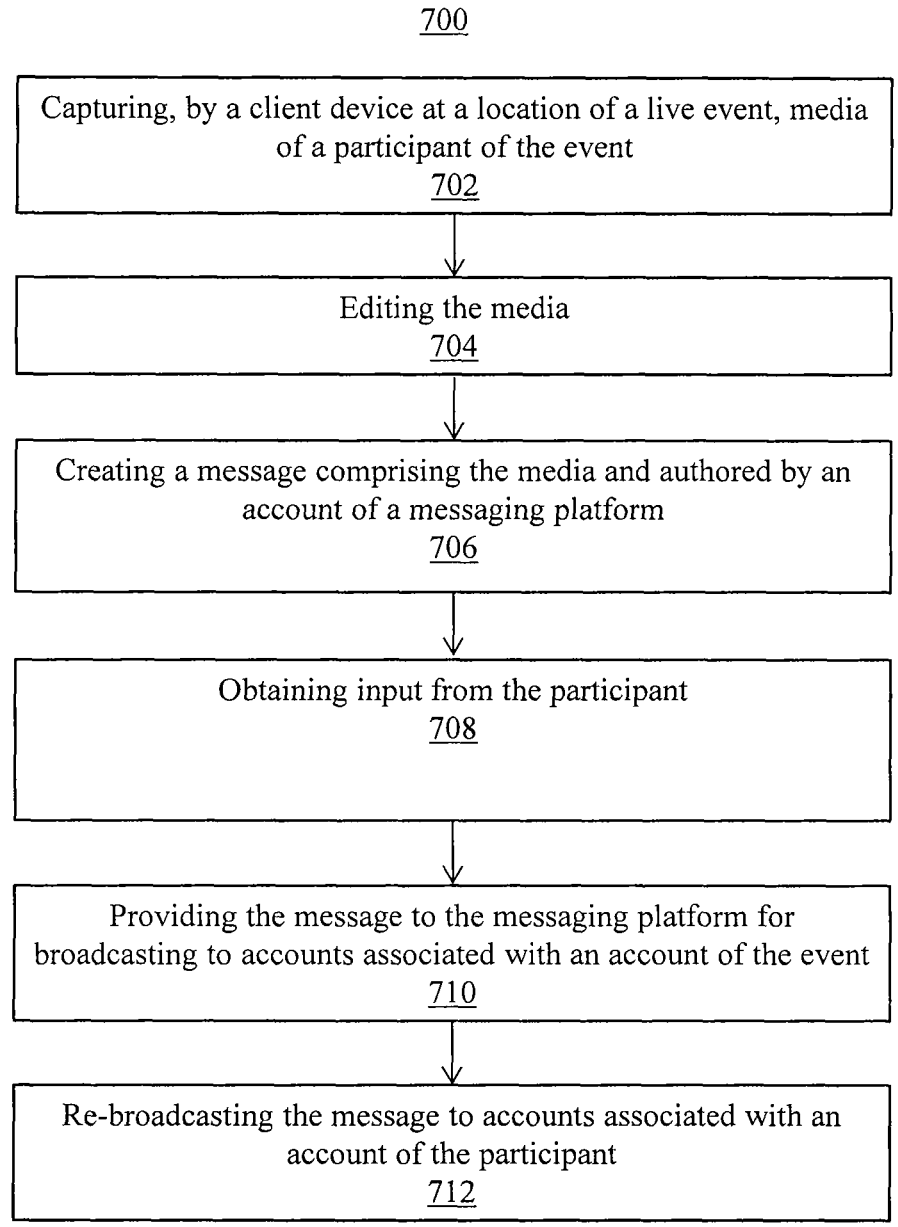
FIG. 7 depicts a flowchart of a method for transmitting a broadcast message in accordance with one or more embodiments of the invention.

FIG. 7 depicts a flow chart of a method 700 for transmitting a message in accordance with one or more embodiments. While the various steps in this flowchart are presented and described sequentially, one of ordinary skill will appreciate that some or all of the steps may be executed in different order and some or all of the steps may be executed in parallel. Further, in one or more embodiments of the invention, one or more of the steps described below may be omitted, repeated, and/or performed in a different order. Accordingly, the specific arrangement of the steps shown in FIG. 8 should not be construed as limiting the scope of the invention.

At step 702, media is captured of a participant of a live event, by a client device at a location of the live event. The client device may include any computing device having sensors (imaging device, microphone, etc.). The client device may include a client 105, such as mirror client device 400 or client 603, to capture media. Media may include images, video, audio, etc. In one embodiment, the live event is being broadcasted live by broadcast partners. The broadcast may be via television, internet, etc. to viewers. In some embodiments, the client device (e.g., mirror client device 400) includes a frame to attract attention from participants, and may be fixed to a wall, stand, held by a host, etc. in a virtual or physical photo-booth type environment. In other embodiments, the client device (e.g., client 603) includes an imaging device coupled to a motor and configured to capture images (e.g., video) of a participant as the imaging device rotates around the participant.

At step 704, the media can be edited before being sent. In one embodiment, editing the image includes altering or retouching the image. Editing can be performed by applying a preset editing option. Editing can also include applying a border on one or more sides of the image. In one embodiment, the media can be uniformly edited or stylized for all images generated for, or relating to, the event. In some embodiments, editing includes drawing or writing messages or an autograph on (e.g., overlaying) the image.

At step 706, a message is created comprising the media. The message may be authored by a messaging platform account of the live event. It should be understood that a user of the authoring account does not necessarily compose the message. For example, the message may be composed and sent automatically. The message may include text, which may be selected from one of a plurality of prewritten messages preapproved by the representatives (e.g., organizers, officials, etc.) associated with the event. In some embodiments, the message includes one or more key phrases (e.g., hashtags) referencing the event, participant, etc. The message may also include links directed to a website of the event, a website of the participant, a live stream of the event, etc.

At step 708, input is obtained from the participant. For example, the participant may input an identifier or username to identify the account of the participant, which can be referenced in one or more key phrases in the message. The account of the participant can be selected in response to one or more of manual entry of an account identifier associated with the participant (manual entry can include use of an autocomplete function), selection of an account identifier associated with the participant from a list, and automatic selection of a participant based on recognition of the participant in the image. The autocomplete and/or list can be based on a list of participants attending the event, a schedule of appearances at the event, etc.

At step 710, the message is provided to the messaging platform for broadcasting to accounts associated with an account of the event. The message is preferably a broadcast message, but may also include other types of messages as well (e.g., reply message, direct message, etc.). The message includes the media and/or content (e.g., text). At step 712, the message is re-broadcast to users of accounts associated with the participant. This may be done using the client 105 or a personal device of the participant. Selection of the account using client 105 may be performed in a similar manner with respect to step 708. The message may be further provided to a media broadcasting system for displaying in real time the message during a live broadcast of the live event.

In one example of the embodiments discussed herein, client 105 may be employed at a live award show, which is being broadcasted live by a television broadcasting system. Client 105 is installed at an offstage location of the award show to allow participants (e.g., presenters and award winners) of the award show to generate messages. For example, client 105 may be mirror computing device 400 having a frame designed to attract attention from the participants and integrate into the award show. In another example, client 105 may be client 603, configured to rotatably observe the participant. A host associated with the award show may be assigned to direct participants to client 105 and aid in capturing media and generating messages.

Client 105 displays a prompt to promote participation from the participants of the award show. The prompt may be a message received from a second client 105 located in a location accessible by those attending the award show. For example, the prompt may be a message from an attendee of the award show congratulating the participant on winning an award. In response to the prompt, client device 105 will receive input to capture a video or other media of the participant.

A message is created on a messaging platform account associated with the award show using client 105. The message includes the captured media and textual content. Client 105 receives input from the participant for writing a message and autographing the media. The textual content is selected by the participant from a set of prewritten messages pre-approved by representatives of the award show. The textual content also includes a key phrase (e.g., hash character) referencing the award show and a reference to the messaging platform account associated with the participant.

The message is provided to the messaging platform from client 105 for broadcasting to accounts associated with (e.g., following) the account associated with the award show. The message provided to the messaging platform includes a higher quality (e.g., high definition) format of the media for providing to the television broadcasting system and a lower quality format of the media for internet embedding. The message is automatically rebroadcasted to accounts associated with the account of the participant. The message is also provided to the television broadcasting system for displaying the message during a live broadcast of the award show. For example, the message may be provided to the media broadcasting system based on an increase in the volume of messages associated with the award show on the messaging platform during the award show as compared with a threshold. The threshold may be a percent increase in message volume from an average volume of messages from an immediately preceding time period Client 105 may also be communicatively coupled to multiple cameras at different locations of the award show. For example, multiple cameras may concurrently capture different angles of a presenter (or other subject) on the stage. During a speech by a presenter, the volume of messages of the messaging platform may spike above a predetermined threshold level. Client 105 identifies a period of time based on the increase in the volume of messages and associates the period of time with the multiple video feeds to identify the relevant video segments. Client 105 automatically stitches together the videos from the multiple cameras for the identified period of time into a single time-synchronized stop motion video. A message including the stop motion video is generated and provided to the messaging platform for broadcasting, e.g., to all accounts of the messaging platform as a promoted message.

Systems, apparatuses, and methods described herein may be implemented using digital circuitry, or using one or more computers using well-known computer processors, memory units, storage devices, computer software, and other components. Typically, a computer includes a processor for executing instructions and one or more memories for storing instructions and data. A computer may also include, or be coupled to, one or more mass storage devices, such as one or more magnetic disks, internal hard disks and removable disks, magneto-optical disks, optical disks, etc.

Systems, apparatus, and methods described herein may be implemented using computers operating in a client-server relationship. Typically, in such a system, the client computers are located remotely from the server computer and interact via a network. The client-server relationship may be defined and controlled by computer programs running on the respective client and server computers.

Systems, apparatus, and methods described herein may be implemented within a network-based cloud computing system. In such a network-based cloud computing system, a server or another processor that is connected to a network communicates with one or more client computers via a network. A client computer may communicate with the server via a network browser application residing and operating on the client computer, for example. A client computer may store data on the server and access the data via the network. A client computer may transmit requests for data, or requests for online services, to the server via the network. The server may perform requested services and provide data to the client computer(s). The server may also transmit data adapted to cause a client computer to perform a specified function, e.g., to perform a calculation, to display specified data on a screen, etc. For example, the server may transmit a request adapted to cause a client computer to perform one or more of the method steps described herein, including one or more of the steps of FIG. 7. Certain steps of the methods described herein, including one or more of the steps of FIG. 7, may be performed by a server or by another processor in a network-based cloud-computing system. Certain steps of the methods described herein, including one or more of the steps of FIG. 7, may be performed by a client computer in a network-based cloud computing system. The steps of the methods described herein, including one or more of the steps of FIG. 7, may be performed by a server and/or by a client computer in a network-based cloud computing system, in any combination.

Systems, apparatus, and methods described herein may be implemented using a computer program product tangibly embodied in an information carrier, e.g., in a non-transitory machine-readable storage device, for execution by a programmable processor; and the method steps described herein, including one or more of the steps of FIG. 7, may be implemented using one or more computer programs that are executable by such a processor. A computer program is a set of computer program instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Figure 8:
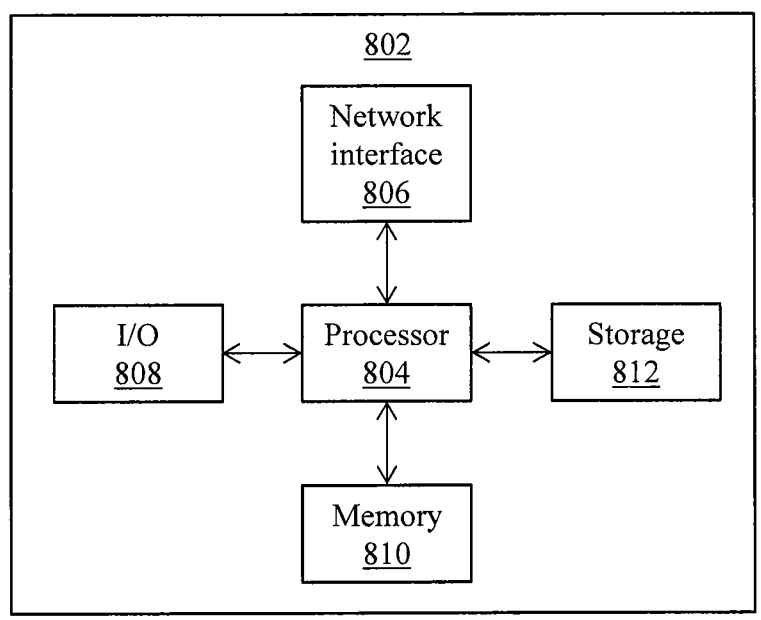
FIG. 8 depicts a high-level block diagram of a computer for transmitting a broadcast message in accordance with one or more embodiments of the invention.

A high-level block diagram of an example computer that may be used to implement systems, apparatus, and methods described herein is depicted in FIG. 8. Computer 802 includes a processor 804 operatively coupled to a data storage device 812 and a memory 810. Processor 804 controls the overall operation of computer 802 by executing computer program instructions that define such operations. The computer program instructions may be stored in data storage device 812, or other computer readable medium, and loaded into memory 910 when execution of the computer program instructions is desired. Thus, the method steps of FIG. 7 can be defined by the computer program instructions stored in memory 810 and/or data storage device 812 and controlled by processor 804 executing the computer program instructions. For example, the computer program instructions can be implemented as computer executable code programmed by one skilled in the art to perform the method steps of FIG. 7. Accordingly, by executing the computer program instructions, the processor 804 executes the method steps of FIG. 7. Computer 802 also includes one or more network interfaces 806 for communicating with other devices via a network. Computer 802 also includes one or more input/output devices 808 that enable user interaction with computer 802 (e.g., display, keyboard, mouse, speakers, buttons, etc.).

Processor 804 may include both general and special purpose microprocessors, and may be the sole processor or one of multiple processors of computer 802. Processor 804 may include one or more central processing units (CPUs), for example. Processor 804, data storage device 812, and/or memory 810 may include, be supplemented by, or incorporated in, one or more application-specific integrated circuits (ASICs) and/or one or more field programmable gate arrays (FPGAs).

Data storage device 812 and memory 810 each include a tangible non-transitory computer readable storage medium. Data storage device 812, and memory 810, may each include high-speed random access memory, such as dynamic random access memory (DRAM), static random access memory (SRAM), double data rate synchronous dynamic random access memory (DDR RAM), or other random access solid state memory devices, and may include non-volatile memory, such as one or more magnetic disk storage devices such as internal hard disks and removable disks, magneto-optical disk storage devices, optical disk storage devices, flash memory devices, semiconductor memory devices, such as erasable programmable read-only memory (EPROM), electrically erasable programmable read-only memory (EEPROM), compact disc read-only memory (CD-ROM), digital versatile disc read-only memory (DVD-ROM) disks, or other non-volatile solid state storage devices.

Input/output devices 808 may include peripherals, such as a printer, scanner, display screen, etc. For example, input/output devices 808 may include a display device such as a cathode ray tube (CRT) or liquid crystal display (LCD) monitor for displaying information to the user, a keyboard, and a pointing device such as a mouse or a trackball by which the user can provide input to computer 902.

Figure 9:
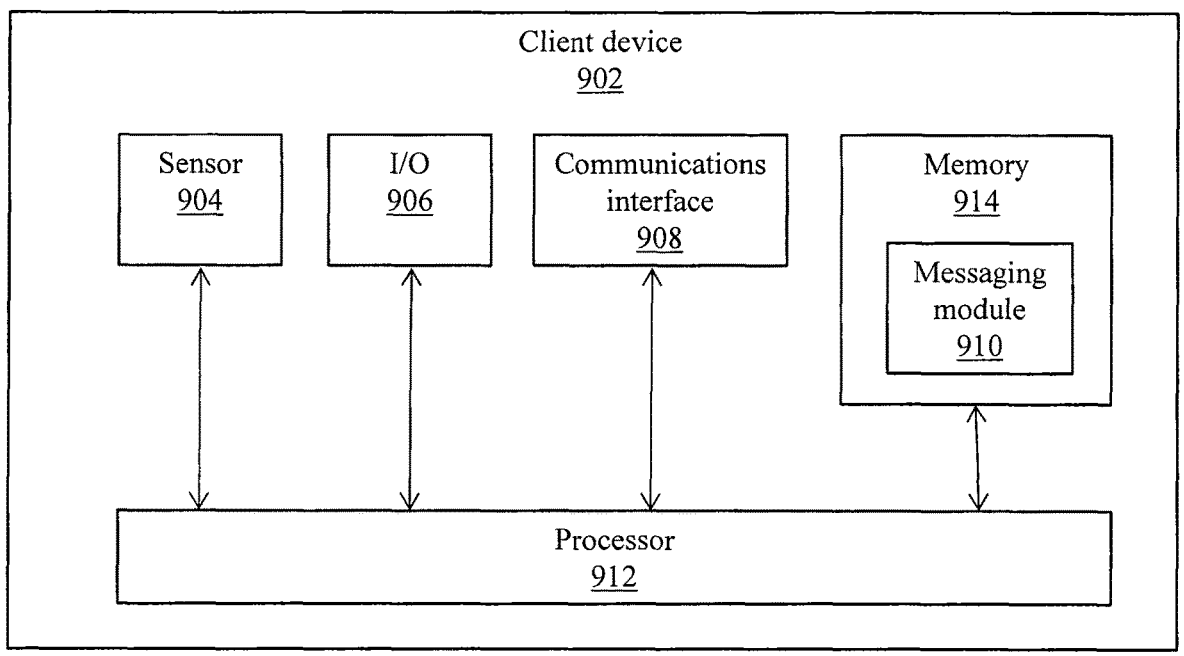
FIG. 9 depicts a high-level block diagram of a client device for providing a message to a messaging platform in accordance with one or more embodiments of the invention.

FIG. 9 shows a high-level block diagram of an example of a client device 902. Client 105, mirror client device 400, client device 600 may be implemented using client device 902. Client device 902 includes a processor 912 communicatively coupled to sensor 904 (e.g., camera, microphone, etc.), input/out user interface 906, communications interface 908 (e.g., network interface), and memory 914 storing messaging module 910. Messaging module 910 may perform one or more of the method steps of FIG. 7. For example, messaging module 910 may receive media from sensor 904 for creating a message comprising the media.

Any or all of the systems and apparatus discussed herein, including messaging platform 100, client 105, mirror client device 400, client device 600, and client device 902, may be implemented using one or more computers such as computer 802.

One skilled in the art will recognize that an implementation of an actual computer, computer system, or client device may have other structures and may contain other components as well, and that FIGS. 8 and 9 are high level representations of some of the components of such a computer and client device for illustrative purposes.

The foregoing Detailed Description is to be understood as being in every respect illustrative and exemplary, but not restrictive, and the scope of the inventive concept disclosed herein is not to be determined from the Detailed Description, but rather from the claims as interpreted according to the full breadth permitted by the patent laws. It is to be understood that the embodiments shown and described herein are only illustrative of the principles of the inventive concept and that various modifications may be implemented by those skilled in the art without departing from the scope and spirit of the inventive concept. Those skilled in the art could implement various other feature combinations without departing from the scope and spirit of the inventive concept.

The invention claimed is:

1. A method for providing messages using a system comprising multiple cameras installed at a location of a live event and a messaging platform including one or more computers and being configured to provide a messaging account on a social media network for the live event, the method comprising:
receiving, from each of the multiple cameras, image content of the live event;
identifying a time period during the live event based on a volume of messages on the social media network relating to the live event;
identifying, for each of the multiple cameras, captured image content based on the identified time period;
forming a single video comprising identified captured image content;
authoring a message for the messaging account of the live event, the message comprising the single video; and
providing the message to the messaging platform for sending the message, during the live event, over a message distribution network, to followers of the messaging account of the live event, and for providing the message to a media broadcasting system for including the message in a live broadcast of the live event.

2. The method as recited in claim 1, further comprising:
randomly selecting a prompt from a plurality of prewritten prompts;
displaying, by a display, the prompt; and
receiving input to control one of the multiple cameras to capture image content in response to the displaying.

3. The method as recited in claim 1, further comprising:
displaying image content captured by one of the multiple cameras; and receiving input comprising an autograph overlaid on the displayed image.

4. The method as recited in claim 1, further comprising:
displaying a plurality of prewritten messages preapproved by representatives of the live event;
receiving a selection of one of the plurality of prewritten messages; and
attaching the selected prewritten message to the message.

5. The method as recited in claim 1, further comprising receiving a username associated with a user account of the messaging platform.

6. The method as recited in claim 1, further comprising:
displaying a list of a plurality of account identifiers;
receiving a selection of one of the plurality of account identifiers from the list; and
attaching a key phrase referencing the selected account identifier to the message.

7. The method as recited in claim 6, wherein the list is based on at least one selected from a group consisting of:
users attending the event,
a scheduled time of appearance of a user, and
identification of a user in images captured by one or more of the multiple cameras.

8. The method as recited in claim 1, further comprising:
providing the message in a first quality format for sending over the messaging platform and in a second quality format higher than the first quality format for providing to the media broadcasting system.

9. The method as recited in claim 1, wherein the message is automatically provided to the media broadcasting system based on the current volume of messages exceeding the threshold value.

10. A system installed as a fixture at a location of a live event, comprising:
multiple cameras; and
a client device in communication with the multiple cameras and comprising at least one hardware processor, the client device being configured to perform operations comprising:
controlling capturing, by the multiple cameras, of image content of the live event;
identifying a time period during the live event based on a volume of messages on the social media network relating to the live event;
identifying, for each of the multiple cameras, captured image content based on the identified time period;
forming a single video comprising identified captured image content;
authoring a message for a messaging account of the live event, the message comprising the single video; and
providing the message to the messaging platform for sending the message, during the live event, over a message distribution network, to followers of the messaging account of the live event, and for providing the message to a media broadcasting system for including the message in a live broadcast of the live event.

11. The system as recited in claim 10, wherein the client device is further configured to perform operations comprising:
displaying image content captured by one of the multiple cameras; and
receiving input comprising an autograph overlaid on the displayed image content.

12. The client device as recited in claim 10, wherein the client device is further configured to perform operations comprising:

receiving a second message from another client device at a different location of the live event;
displaying the second message; and
receiving input to perform capturing in response to displaying the second message.

13. A non-transitory computer readable medium comprising instructions for providing messages to followers of a live event using a system comprising multiple cameras mounted at a location of a site of the live event and a messaging platform including one or more computers and being configured to provide a messaging account for the live event, the instructions, when executed by one or more computer processors of a messaging computer in communication with the messaging platform and the multiple cameras, enabling the one or more computer processors to control the messaging computer to perform operations comprising:
receiving, from each of the multiple cameras, image content of the live event;
identifying a time period during the live event based on a volume of messages on the social media network relating to the live event;
identifying, for each of the multiple cameras, captured image content based on the identified time period;
forming a single video comprising identified captured image content;
authoring a message for the messaging account of the live event, the message comprising the single video; and
providing the message to the messaging platform for sending the message, during the live event, over a message distribution network, to followers of the messaging account of the live event, and for providing the message to a media broadcasting system for including the message in a live broadcast of the live event.

14. The non-transitory computer readable medium as recited in claim 13, wherein the instructions, when executed, further enable the one or more computer processors to control the messaging computer to perform operations comprising:
providing the message in a first quality format for sending over the messaging platform and in a second quality format higher than the first quality format for providing to the media broadcasting system.

15. A system for providing messages to followers of a live event, comprising:
a messaging platform comprising one or more computers, the messaging platform being configured to provide messaging accounts on a social media network, the messaging accounts including a messaging account of the live event;
multiple cameras mounted at a site of the live event; and
a messaging computer in communication with the messaging platform and the multiple cameras, the messaging computer being configured to at least:
receive, from each of the multiple cameras, image content of the live event;
identifying a time period during the live event based on a volume of messages on the social media network relating to the live event;
identify, for each of the multiple cameras, captured image content based on the identified time period;
forming a single video comprising identified captured image content;
author a message for the messaging account of the live event, the message comprising the single video; and
provide the message to the messaging platform for identifying followers of the messaging account of the live event and sending the message, during the live event, to the identified followers over a message distribution network, and for providing the message to a media broadcasting system for including the message in a live broadcast of the live event.

16. The system as recited in claim 15, wherein one of the multiple cameras is mounted to a mirror frame.

17. The system as recited in claim 15, wherein one of the multiple cameras is mounted within a photo booth structure.

18. An apparatus comprising:
   storage for storing image content from multiple cameras for a live event; and
   a hardware processor configured to control the apparatus to at least:
   identify a time period during the live event based on a volume of messages relating to the live event on a messaging platform of a social media network during the time period;
   identify, for each of the multiple cameras, image content stored in the storage based on the identified time period;
   stitch the identified image content into a single time-synchronized stop motion video;
   create a message for a messaging account of the live event, the message including the stop motion video;
   send the message to the messaging platform for broadcasting, during the live event, over a message distribution network, and for sending the message to a media broadcasting system for including the message in a live broadcast of the live event.

19. The apparatus according to claim 18, wherein messages relating to the live event include a hashtag corresponding to the live event.

20. A system comprising:
   an apparatus according to claim 18; and
   a messaging platform to which the message is sent, the messaging platform being configured to identify followers of the messaging account of the live event and send the message to the identified followers over a message distribution network during the live event, and to send the message to a media broadcasting system for including the message in a live broadcast of the live event.

* * * * *